United States Patent
Jeney

(10) Patent No.: US 10,014,087 B2
(45) Date of Patent: Jul. 3, 2018

(54) APPARATUS FOR CLEANING CONTAMINATED WATER FROM RADIOACTIVE MATERIALS

(71) Applicant: CleanCarbonConversion Patents AG, Pfäffikon SZ (CH)

(72) Inventor: Peter Jeney, Zug (CH)

(73) Assignee: CLEANCARBONCONVERSION PATENTS AG, Ch-Pfäffikon SZ (CH)

( * ) Notice: Subject to any disclaimer, the term of this patent is extended or adjusted under 35 U.S.C. 154(b) by 0 days.

(21) Appl. No.: 15/114,260

(22) PCT Filed: Jan. 31, 2014

(86) PCT No.: PCT/EP2014/051948
§ 371 (c)(1),
(2) Date: Jul. 26, 2016

(87) PCT Pub. No.: WO2015/113629
PCT Pub. Date: Aug. 6, 2015

(65) Prior Publication Data
US 2017/0236606 A1     Aug. 17, 2017

(51) Int. Cl.
*G21F 9/06*     (2006.01)
*G21F 9/00*     (2006.01)
*F01D 15/10*    (2006.01)

(52) U.S. Cl.
CPC .............. *G21F 9/06* (2013.01); *F01D 15/10* (2013.01); *G21F 9/008* (2013.01); *F05D 2210/12* (2013.01)

(58) Field of Classification Search
CPC .............. G21F 9/06; G21F 9/008; F01D 15/10
USPC ........................................................ 588/20
See application file for complete search history.

(56) References Cited

U.S. PATENT DOCUMENTS 4,579,069 A   4/1986 Gay
5,160,636 A   11/1992 Gilles et al.

FOREIGN PATENT DOCUMENTS

| DE | 4338851 A1 | 5/1995 |
|---|---|---|
| JP | 56-175742 | 5/1955 |
| JP | 47-20979 | 10/1972 |
| JP | 59-206798 | 11/1984 |
| JP | 3048450 | 2/1998 |
| WO | WO 2011/136727 A1 | 11/2011 |

OTHER PUBLICATIONS

Office Action from Japanese Patent Office, issued in corresponding Japanese Application No. 2016-567136, dated Oct. 3, 2017.

*Primary Examiner* — Edward Johnson
(74) *Attorney, Agent, or Firm* — Preti Flaherty Beliveau & Pachios LLP

(57) ABSTRACT

Apparatus and methods for treating radioactive material, in particular for cleaning radioactive contaminated water, are described. One apparatus comprises a process chamber with a combustion zone for generating an oxygen rich gas and an oxidation zone, which is arranged to receive the oxygen rich gas from the combustion zone. The process chamber further comprises a feed opening for feeding the radioactive material into the oxidation zone and is configured to use the oxygen rich gas for oxidizing the radioactive material to obtain oxidized material. The apparatus further comprises a separation device operationally connected to an outlet of the process chamber and configured to at least partly separate the oxidized material into a gaseous fluid and a non-gaseous residue. This way a greatly reduced volume of the radioactive material is achieved, enabling safe and efficient handling and/or compact and space-saving disposal of the radioactive material.

9 Claims, 3 Drawing Sheets

APPARATUS FOR CLEANING CONTAMINATED WATER FROM RADIOACTIVE MATERIALS

TECHNICAL FIELD OF THE INVENTION

The present invention concerns an apparatus and a method for treating radioactive material, in particular for cleaning radioactive contaminated water.

SUMMARY OF THE INVENTION

The use of radioactive material and its problems concerning the reuse and/or disposal of this material is well-known in the prior art. The present invention has the objective to propose an improved apparatus and an improved method for treating radioactive material, in particular for cleaning radioactive contaminated water.

This objective is reached by an apparatus comprising the features specified in claim 1. Further embodiments of the apparatus, a method according to the invention and further embodiments of the method are specified in the further claims.

The invention concerns an apparatus for treating radioactive material, in particular for cleaning radioactive contaminated water. The apparatus comprises a process chamber with a combustion zone for generating an oxygen rich gas and an oxidation zone, which is arranged to receive the oxygen rich gas from the combustion zone. The process chamber further comprises a feed opening for feeding the radioactive material into the oxidation zone and the process chamber is configured to use the oxygen rich gas for oxidizing the radioactive material to obtain oxidized material. The apparatus further comprises a separation device operationally connected to an outlet of the process chamber and configured to at least partly separate the oxidized material into a gaseous fluid and a non-gaseous residue. This way a greatly reduced volume of the radioactive material is achieved, enabling safe and efficient handling and/or compact and space-saving disposal of the radioactive material.

Surprisingly, the solution according to invention achieves a greatly reduced volume of the radioactive material by oxidizing this material. To a large extend, this helps to solve or even avoids the well-known problems of reuse and/or disposal of radioactive material, for example the bulky transportation of the radioactive material and/or the storing of the radioactive material in bunkers, underground caves, etc. for extended periods of time.

In an embodiment of the apparatus according to the invention, the process chamber comprises a radiation shield, which in particular at least partly surrounds the oxidation zone and/or extends downstream of the feed opening.

In a further embodiment of the apparatus according to the invention, the radiation shield is at least partly provided by a cooling system of the process chamber, in particular by a cooling mantle and a cooling fluid contained within the cooling mantle. This way a very effective shielding is achieved.

In a further embodiment of the apparatus according to the invention, the process chamber comprises a cooling mantle, in particular a water-cooled mantle, and wherein in particular the cooling mantle is arranged to at least partly cool the wall of the process chamber surrounding the combustion zone and/or the oxidation zone.

In a further embodiment of the apparatus according to the invention, the process chamber comprises at least one channel opening connecting the interior of the cooling mantle to the interior of the process chamber for injecting cooling fluid, in particular cooling water, from the cooling mantle into the process chamber, wherein in particular the channel opening is arranged adjacent to the downstream outlet of the process chamber. This way an instant drop down of the temperatures of the processed material is achieved. Such immediate freezing of the reaction stabilizes the metal compounds.

In a further embodiment of the apparatus according to the invention, the channel opening is arranged adjacent to the downstream outlet of the process chamber.

In a further embodiment of the apparatus according to the invention, the process chamber comprises a fuel inlet for feeding a fuel to the combustion zone, in particular kerosene.

In a further embodiment of the apparatus according to the invention, the process chamber comprises an oxygen inlet for feeding an oxidizing fluid to the combustion zone, in particular liquid oxygen and/or hydrogen peroxide. Thus, a cost effective solution is achieved.

In a further embodiment of the apparatus according to the invention, the process chamber is configured to provide at least one of:
  the oxygen rich gas at a minimum temperature of 3000 C, in particular 3200 C,
  the temperature in the oxidation zone between 1500 C and 1800 C, and
  the oxidized material at a maximum temperature of 800 C, in particular 500 C.

Such temperatures are particular advantageous for performing exothermic reactions and/or freezing reactions.

In a further embodiment of the apparatus according to the invention, the radioactive material comprises radioactive contaminated water, in particular water and at least one radioactive metal, and/or the gaseous fluid is mainly vapor, in particular water vapor.

In a further embodiment of the apparatus according to the invention, the separation device is a cyclone. This provides a particular effective separation between the gaseous fluid and the non-gaseous residue.

In a further embodiment of the apparatus according to the invention, the process chamber comprises a combustion chamber containing the combustion zone and adjacent thereto an oxidation chamber containing the oxidation zone.

Further, the invention concerns a method for treating radioactive material, in particular for cleaning radioactive contaminated water, the method comprising the steps of:
  providing a process chamber with a combustion zone and an oxidation zone;
  generating oxygen rich gas in the combustion zone;
  transferring the oxygen rich gas from the combustion zone to the oxidation zone;
  feeding the radioactive material via a feed opening of the process chamber into the oxidation zone;
  using the oxygen rich gas for oxidizing the radioactive material to obtain oxidized material;
  transferring the oxidized material to a separation device operationally connected to the outlet of the process chamber; and
  at least partly separating the oxidized material into a gaseous fluid and a non-gaseous residue.

This way a significant volume reduction of the radioactive material is achieved.

In a further embodiment of the method according to the invention, the method further comprises the step of at least partly recovering the gaseous fluid as clean vapor and/or clean water, in particular thereby driving a turbine and/or a generator for generating electricity.

In a further embodiment of the method according to the invention, the method further comprises the step of recovering the non-gaseous residue for further commercialization and/or safe disposal.

In a further embodiment of the method according to the invention, the method further comprises the step of controlling the oxidation temperature by controlling the flow of the radioactive material and/or the oxygen rich gas, in particular the flow of a fuel and/or an oxidizing fluid.

It is expressly pointed out that any combination of the above-mentioned embodiments, or combinations of combinations, is subject to a further combination. Only those combinations are excluded that would result in a contradiction.

BRIEF DESCRIPTION OF THE DRAWINGS

Below, the present invention is described in more detail by means of exemplary embodiments and the included simplified drawings. It is shown in.

BRIEF DESCRIPTION OF THE INVENTION

The described embodiments are meant as illustrating examples and shall not confine the invention.

The present invention concerns an apparatus and a method for treating radioactive material, in this example the cleaning of contaminated water from radioactive metals.

Radioactive wastes are wastes that contain radioactive materials which are usually byproducts of nuclear power generation and other applications of nuclear fission, or cleaning or cooling processes involving radioactive materials. Radioactive waste is hazardous to most forms of life and the environment. Typically, radioactive materials comprise at least one radioactive metal such as isotopes of cesium or strontium.

Radioactivity naturally decays over time until it no longer poses a hazard. The period of time of such waste must be stored depends on the type of waste and the radioactive isotopes. It can range from a few days for very short lived isotopes to millions of years. In view of this, the current most common approach is to store such material in bunkers, underground caves, etc. for extended periods of time.

The invention described in this example relates to an ultra-high temperature oxidation apparatus, also called reactor unit, with the aim to precipitate radioactive metals from radioactive contaminated waters, so that the huge volumes of accumulated hazards can be reduced to a minimum and the cleaned water can be reintroduced into its natural circulation.

Figure 1:
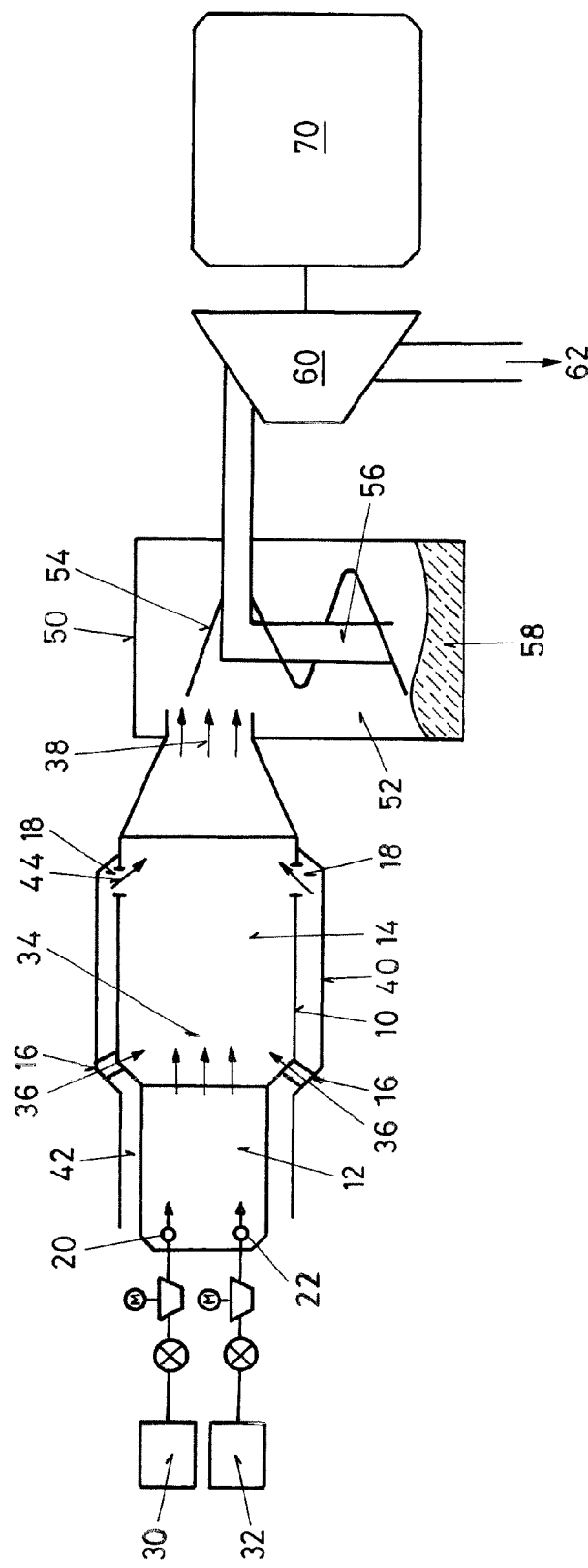
FIG. 1 a diagram schematically illustrating the apparatus according to the invention.

FIG. 1 shows a diagram, which schematically illustrates the apparatus according to the invention. The apparatus comprises two tanks, one for an oxidation liquid 32 as oxidizing fluid, for example hydrogen peroxide, and the other one for a liquid fuel 30, for example kerosene. Further, the apparatus comprises a high pressure, high temperature process chamber 10 with a combustion chamber 12, which defines a combustion zone, and an oxidation chamber 14 defining an oxidation zone. Further, the process chamber 10 comprises a feed opening 16 for introducing the contaminated water 36 into the oxidation chamber 14. The process chamber 10 comprises a water-cooled mantle 40, which is arranged to cool the wall of the process chamber 10, i.e. the combustion chamber 12 and the oxidation chamber 14.

In this example, the apparatus further comprises a cyclone separator 50 as a separation device, which is directly attached to the process chamber 10.

Both liquids, the liquid fuel 30 together with the oxidation liquid 32, are injected into the combustion chamber 12, the liquid fuel 30 via a fuel inlet 20 and the oxidation liquid 32 via an oxygen inlet 22. In the combustion chamber 12 both liquids are ignited for burning. The burning creates oxygen rich gas 34 at temperatures between 3000-3200 C, thereby building up a pressure in excess of 15 bar.

The radioactive contaminated water 36 is fed into the second part of the process chamber 10, which is the oxidation chamber 14 defining the oxidation zone. The contaminated water 36 instantly mixes with the hot oxygen rich gas 34 introduced from the upstream combustion chamber 12, causing an ultra-rapid oxidation reaction. In this zone the pressure is kept at over 15 bar and temperatures occur up to 1500 C. In this very fast exothermic reaction the instant oxidation of the metals of the contaminated water 36 occurs.

The outside of the process chamber 10 is water-cooled by cooling water 42, whereas the used cooling water 44 is injected into the process chamber 10 at the end of the process chamber 10 causing an instant drop down of the temperatures of the gases and oxides to 500° C. Such immediate freezing of the reaction stabilizes the metal compounds. Thus, the radioactive material 36 is oxidized into oxidized material 38 by means of the oxygen rich gas 34 and the used cooling water 44.

Following the step of oxidation, the oxidized material 38 is exhausted to the cyclone separator 50, which is also called partition chamber.

In this last part of the process, a strong cyclone 54 of the cyclone separator 50 separates a non-gaseous residue of the oxidized material 38, in this case solid particles 58, form a gaseous fluid of the oxidized material 38. In this example the gaseous fluid is a water vapor 56. The oxidized solid particles 58 are collected on the bottom of the cyclone separator 50, whereas the now clean water vapor 56 leaves the apparatus for further utilization.

The crucial part of this invention is the ultra-rapid oxidation of the radioactive metals and their precipitation from contaminated water, while at the same time the process also accelerates the natural radioactive decay.

In a further example, the invention involves an ultra-high temperature apparatus to oxidize the radioactive metals, the apparatus comprising of:

a combustion chamber 12, an oxidation chamber 14 including a feed apparatus (not shown) to feed contaminated water 36 and a water-cooled mantle 40, whereas the used cooling water 44 is injected downstream into the oxidation chamber 14.

The invention also involves a method to control the temperature by controlling the flow of the oxidizer. In another example, the invention involves the oxidation chamber 14 leading into the cyclone 50 as a separation device.

In a further example, the invention involves an ultra-high temperature apparatus according to the above wherein the process chamber 10 is configured in such a way that three process zones are obtained as follows:
   a. Combustion zone
   b. Oxidation zone
   c. Separation zone In another example, the above method involves cleaning of radioactive contaminated water 36. In a further example, the contaminated water 36 is converted into clean water vapor 56 for the recovery of clean water. In a further example, the solid particles 58 comprising the oxidized metals can be recovered for further commercialization or safe disposal.

The solution to the problem of cleaning contaminated water from radioactive materials as proposed by the present invention involves ultra-high temperature oxidation. As mentioned above, the most important problem to solve is the vast amount of accumulated contaminated water that is, in the meantime unrestrained, spreading over vast areas. This situation urgently needs to get under control, the amount of contaminated water lessened respectively, to prevent additional spreading and further amplification of the problem.

The solution presented herein is to separate the metals from the contaminated water and thus decontaminate and clean the water. Metals are precipitated from contaminated water by rapid oxidation, leaving the water free of radioactive material. A great reduction in the volume of contaminated material and therefore limiting the danger is thus achieved.

In a further example, the apparatus according to the invention is composed of five main parts:
1. two tanks for the oxidation liquid 32 and the liquid fuel 30,
2. a high pressure and high temperature combustion chamber defining the combustion zone 12,
3. an oxidation zone 14 into which the contaminated water 36 is inserted,
4. a cyclone separator 50 with a precipitation zone 52 to separate the frozen solid particles 58 from the water vapor 56, and
5. optionally, a turbine 60 and a generator 70 for subsequent utilization of the hot water vapor 56 for electricity production.

The combustion zone 12 forms the first part of the apparatus. Liquid fuel 30 together with oxidation liquid 32 is injected into the combustion zone 12 where they are ignited and are burning, creating oxygen rich gas 34. The temperature can be controlled by adjusting the flow ratio of the liquids, i.e. the liquid fuel 30 and the oxidation liquid 32.

The pressure is kept at 15 Bar and the temperature between 3000 C and 3200 C. The radioactive water 36 is fed into the second part of the apparatus, which comprises the oxidation zone 14. The radioactive water 36 instantly mixes with the hot oxygen rich gas 34 that is introduced from the previous process step causing an ultra-rapid oxidation to take place. The temperature and the consequent pressure in the oxidation zone 14 are conducted by the specific temperatures of the hot gases and the flow rate of the radioactive water 36 and/or the flow rate of the oxygen rich gas 34. The pressure in the oxidation zone is kept at 15 Bar and the temperature between 1500 C and 1800 C.

The temperature limits are important because within the mentioned range nearly all elements form oxides in an oxygen enriched environment. At very fast exothermic reactions—such as the complete and rapid oxidation of metals—vibration radiation is formed, which causes a breakdown of the nuclear radiation.

The outside of the first as well as the second part of the unit are water-cooled by the cooling water 42. At the end of the second part this cooling water 42 is injected into the oxidation chamber via channel openings 26.

This instantly lets the temperature of the oxidized material 38, i.e. the gases and oxides, drop down to 500 C. This instant freezing of the chemical reactions stabilizes the metal compounds. The velocity of this stabilization process of the metal components can be easily be monitored by the much enhanced radiation in the oxidation chamber. The walls containing the oxidation zone 12, i.e. the walls of the oxidation chamber, are shielded to protect the environment from the intense radioactive radiation.

The third part of the unit is formed by the precipitation zone incorporating the strong cyclone separator 50. The cyclone separator 50 separates the solid particles 58 from the water vapor gas 56, whereas the solid particles 58 collect on the bottom and the water vapor gas 56, now clean, leaves the unit for further utilization. A sensible utilization of the created water vapor gases can be the generation of electricity with a turbine. The created power would then be used to operate the apparatus according to the present invention, to drive various pumps or could be sold to a grid.

The crucial part of this technology is therefore the ultra-rapid oxidation of metals and their subsequent precipitation from the contaminated water, leaving clean water that can be reintroduced into its natural circulation.

Figure 2:
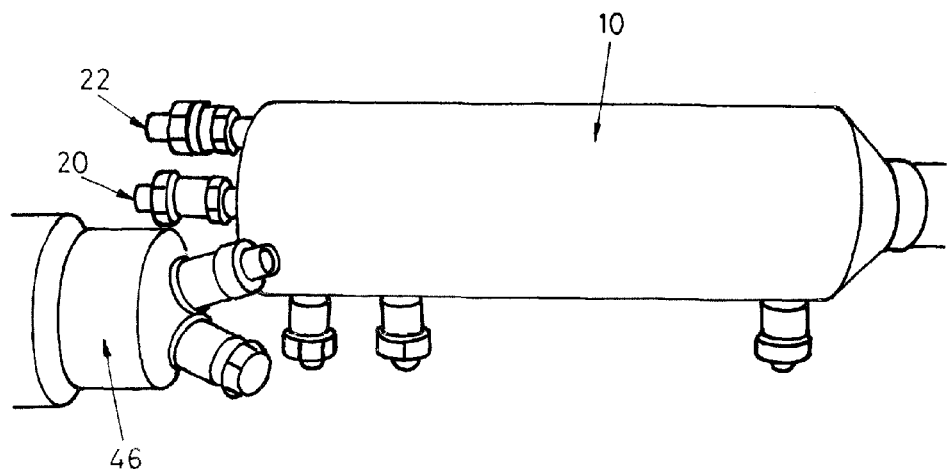
FIG. 2 an illustration showing a top-side view of the process chamber according to FIG. 1.

FIG. 2 shows an illustration showing a top-side view of the process chamber 10 according to FIG. 1, which comprises a fuel inlet 20 for feeding a fuel to the combustion zone 12, e.g. kerosene, and an oxygen inlet 22 for feeding an oxidizing fluid to the combustion zone, e.g. hydrogen peroxide. Further, FIG. 2 shows device 46 for controlling the flow of the radioactive material 36.

Figure 3:
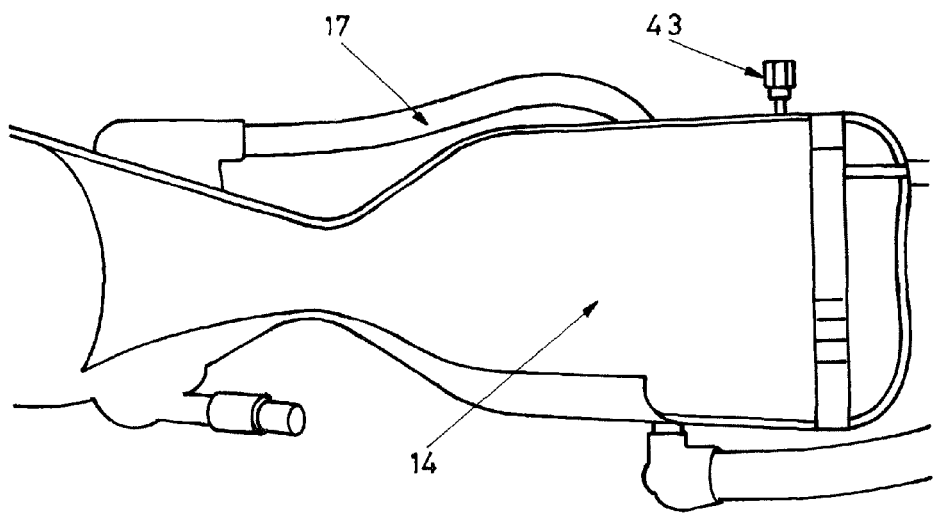
FIG. 3 an illustration showing a sectional view of the process chamber according to FIG. 1.

FIG. 3 shows an illustration showing a sectional view of the process chamber according to FIG. 1, which comprises in its interior the oxidation zone 14. Further, FIG. 3 shows a pipe 17 for feeding the radioactive material into the oxidation zone 14 and an inlet 43 of the water-cooling of the process chamber.

Figure 4:
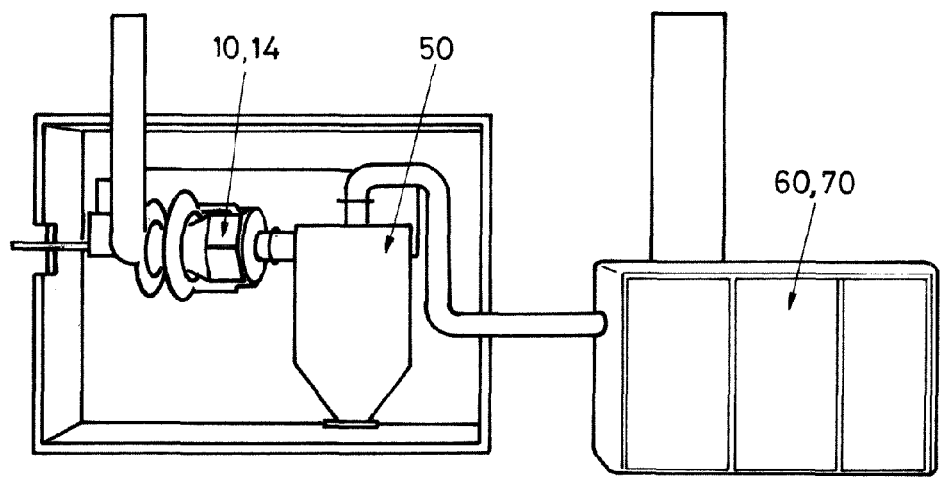
FIG. 4 an illustration showing a perspective view of the apparatus according to the invention.

FIG. 4 shows an illustration showing a perspective view of the apparatus according to the invention with a process chamber 10 enclosing the oxidation zone 14. A cyclone 50, which is connected to an outlet of the process chamber 10 is operating as a separation device, i.e. the cyclone 50 is configured to separate the material received from the process chamber 10 in a gaseous fluid and a non-gaseous residue. The gaseous fluid is transferred to a Steam-Turbine 60 with a Generator 70 for producing electricity.

Figure 5:
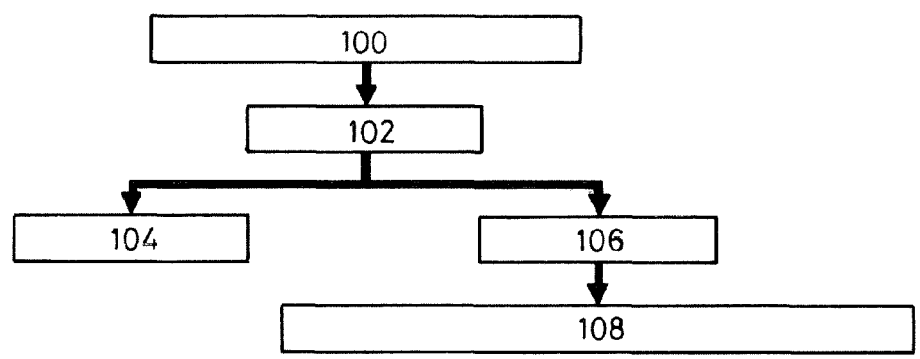
FIG. 5 a schematic flow-chart depicting the principle of the method according to the invention.

FIG. 5 shows a schematic flow-chart depicting the principle of the method according to the invention. In this example, the method comprises the following steps:
100: providing contaminated water, proceeding to step 102;
102: performing a rapid oxidation, proceeding to step 104 and 106;
104: obtaining clean water;
106: obtaining oxidized metals, proceeding to step 108; and
108: obtaining a greatly reduced volume corresponding to a greatly decreased danger.

The invention claimed is:
1. An apparatus for treating radioactive material, in particular for cleaning radioactive contaminated water, the apparatus comprising
   a process chamber with a combustion zone for generating an oxygen rich gas and
   an oxidation zone arranged to receive the oxygen rich gas from the combustion zone, wherein the process chamber comprises a feed opening for feeding the radioactive material into the oxidation zone and the process chamber is configured to use the oxygen rich gas for oxidizing the radioactive material to obtain oxidized material, wherein the process chamber also comprises a radiation shield, which in particular at least partly surrounds the oxidation zone and/or extends downstream of the feed opening, and wherein the radiation shield is at least partly provided by a cooling system of the process chamber, in particular by a cooling mantle and a cooling fluid contained within the cooling mantle, the apparatus further comprising a separation device operationally connected to an outlet of the process chamber and configured to at least partly separate the oxidized material into a gaseous fluid and a non-gaseous residue.

2. The apparatus according to claim 1, wherein the process chamber comprises the cooling mantle, in particular a water-cooled mantle, and wherein in particular the cooling mantle is arranged to at least partly cool a wall of the process chamber surrounding the combustion zone and/or the oxidation zone.

3. The apparatus according to claim 1, wherein the process chamber comprises at least one channel opening connecting an interior of the cooling mantle to an interior of the process chamber for injecting cooling fluid, in particular cooling water, from the cooling mantle into the process chamber, wherein in particular the at least one channel opening is arranged adjacent to a downstream outlet of the process chamber.

4. The apparatus according to claim 1, wherein the process chamber comprises a fuel inlet for feeding a fuel to the combustion zone, in particular kerosene.

5. The apparatus according to claim 1, wherein the process chamber comprises an oxygen inlet for feeding an oxidizing fluid to the combustion zone, in particular liquid oxygen and/or hydrogen peroxide.

6. The apparatus according to claim 1, wherein the process chamber is configured to provide at least one of:
   the oxygen rich gas at a minimum temperature of 3000 C, in particular 3200 C,
   a temperature in the oxidation zone between 1500 C and 1800 C, and
   the oxidized material at a maximum temperature of 800 C, in particular 500 C.

7. The apparatus according to claim 1, wherein the radioactive material comprises radioactive contaminated water, in particular water and at least one radioactive metal, and/or the gaseous fluid is mainly vapor, in particular water vapor.

8. The apparatus according to claim 1, wherein the separation device is a cyclone.

9. The apparatus according to claim 1, wherein the process chamber comprises a combustion chamber containing the combustion zone and adjacent thereto an oxidation chamber containing the oxidation zone.

* * * * *